United States Patent
Stahl et al.

(10) Patent No.: US 10,125,820 B2
(45) Date of Patent: Nov. 13, 2018

(54) PLANETARY ROLLER BEARING

(71) Applicant: Schaeffler Technologies AG & Co. KG, Herzogenaurach (DE)

(72) Inventors: Thomas Stahl, Poppenhausen (DE); Horst Gredy, Oberreichenbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/321,883

(22) PCT Filed: Jun. 2, 2015

(86) PCT No.: PCT/DE2015/200333
§ 371 (c)(1),
(2) Date: Dec. 23, 2016

(87) PCT Pub. No.: WO2015/197060
PCT Pub. Date: Dec. 30, 2015

(65) Prior Publication Data
US 2017/0130773 A1 May 11, 2017

(30) Foreign Application Priority Data

Jun. 24, 2014 (DE) .................. 10 2014 212 029

(51) Int. Cl.
*F16C 33/36* (2006.01)
*F16C 19/36* (2006.01)
*F16C 33/58* (2006.01)

(52) U.S. Cl.
CPC ............ *F16C 33/363* (2013.01); *F16C 19/36* (2013.01); *F16C 33/585* (2013.01); *F16C 2240/50* (2013.01)

(58) Field of Classification Search
CPC .... F16C 33/363; F16C 33/583; F16C 33/585; F16C 19/36
See application file for complete search history.

(56) References Cited

U.S. PATENT DOCUMENTS

| 2,266,888 | A | * | 12/1941 | McCurdy | ............... F16C 19/36 384/550 |
| 6,149,312 | A | * | 11/2000 | Druet | ..................... F16C 19/36 384/550 |
| 6,390,685 | B1 | | 5/2002 | Shiromura et al. | |
| 2014/0378271 | A1 | | 12/2014 | Gredy et al. | |

FOREIGN PATENT DOCUMENTS

| DE | 19823154 C1 | 11/1999 |
| DE | 10042901    | 6/2001  |
| DE | 10249762 A1 | 5/2004  |

(Continued)

Primary Examiner — James Pilkington
(74) Attorney, Agent, or Firm — Volpe and Koenig, P.C.

(57) ABSTRACT

A planetary roller bearing is disclosed. The planetary roller bearing includes an outer ring including a first set of teeth, an inner ring including a second set of teeth, and planetary rolling elements arranged between the outer ring and the inner ring. The planetary rolling elements each include a third set of teeth configured to engage with the first set of teeth and the second set of teeth. A height of at least three successive teeth gradually increases from an axial end of a selected set of the first, second, or third sets of teeth.

7 Claims, 3 Drawing Sheets

(56) References Cited

FOREIGN PATENT DOCUMENTS

| DE | 102005041891 | * | 3/2007 |
| DE | 102011088905 | | 6/2013 |
| DE | 102013204179 | * | 9/2014 |
| DE | 102013213327 | * | 1/2015 |
| EP | 0926369 | | 6/1999 |
| JP | 2008-39035 A | | 2/2008 |
| WO | 2012/158974 A1 | | 11/2012 |

* cited by examiner

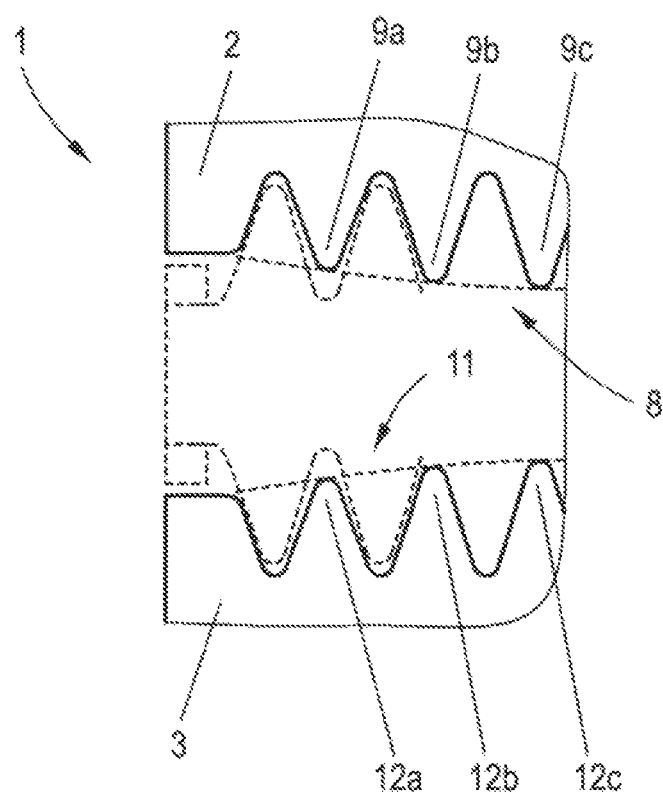

PLANETARY ROLLER BEARING

FIELD OF THE INVENTION

The invention relates to a planetary roller bearing comprising an outer ring with a tooth profile formed on the inner circumference by grooves, an inner ring with a tooth profile formed on the outer circumference by grooves, and multiple planetary rolling elements with a tooth profile formed by grooves, wherein the tooth profiles of the planetary rolling elements engage in the tooth profiles of the rings.

BACKGROUND

Planetary roller bearings are used for absorbing axial and radial forces, wherein forces are predominantly received from the axial direction. A planetary roller bearing are formed of an outer ring, an inner ring, and multiple planetary rolling elements that are arranged between the rings. Both the rings and also the planetary rolling elements are each provided with a tooth profile, wherein each tooth profile is formed by circumferential grooves spaced apart from each other axially. The tooth profiles engage in each other, that is, the teeth of the planetary rolling elements engage in the grooves of the ring profiles and their teeth engage, in turn, in the grooves of the planetary rolling elements.

For guiding the planetary rolling elements, these are constructed on both ends with a cylindrical, non-profiled shoulder that engages in a hole of each cage disk. By applying the cage disks on both sides of the bearing and guiding each planetary rolling element in the holes of the cage disks, a uniform guidance of all planetary rolling elements is guaranteed. For securing the cage disks in the axial direction, these are connected to each other by bars that are formed between the planetary rolling elements in the bearing. The bars here engage through additional holes of the cage disks, wherein the projecting bar end is shaped after assembly. While the rings and the planetary rolling elements are made from steel, for improving the sliding properties, the cage can be made from brass or plastic. For critical surface pressure ratios, however, the use of steel cage disks is also conceivable.

Due to the spring cushioning and tolerance aspects, in the teeth of each tooth profile connected axially one behind the other, the first teeth in contact with each other in the load direction are loaded the most. Tests have now shown that this can cause "stress spikes" on these teeth, which can lead to an overload and possible failure of the first rows of teeth.

SUMMARY

The invention is thus based on the objective of providing a planetary roller bearing that is improved compared with the above.

To achieve this object, in the planetary roller bearing of the type specified above, it is provided according to the invention that the height of at least one first tooth of the planetary rolling element viewed axially or of the outer or inner ring is smaller than that of the subsequent second tooth or that the axial distance of at least one axially viewed first tooth to the subsequent second tooth is smaller than the distance of the second tooth to the third tooth.

According to the invention, a specific tooth profile is provided either on the planetary rolling elements or one or both rings, which has, differently than previously provided, axially and radially viewed complete symmetrical profiles, asymmetry, or inequality.

Here, according to a first invention alternative, the tooth height of at least the axially viewed first tooth of the planetary rolling elements or the rings can be somewhat smaller than the height of at least the subsequent second tooth. This means that the tooth diameter is reduced minimally. This has the effect that this outermost first tooth is taken somewhat out from the load area, consequently is loaded somewhat less strongly and an advantageous, more uniform distribution of the load over the other rows of teeth is produced. According to this alternative it can be sufficient if only the first tooth has a lower height than the second tooth and the second and the following teeth all have the same height. However, it would also be conceivable to form the second tooth, in turn, somewhat smaller than the third tooth and the third, in turn, somewhat smaller than the fourth, so that a slightly crowned profile is formed, seen on one side.

One alternative to varying the tooth height or the tooth diameter provides, as described, to form the axial distance of at least the first tooth to the second tooth somewhat smaller than the distance of the second to the third tooth. In this way, it can also be achieved that the first tooth is taken somewhat out from the load area and is loaded less so that the load is better distributed over the remaining teeth. Here, of course, the distance of the first to the second tooth could also be somewhat smaller than that of the second to the third tooth, as well as also the distance of the second tooth to the third tooth could be somewhat smaller than that of the third to the fourth tooth, etc., so that not only the first tooth is taken out from the load area, but at least also the second and optionally the third tooth.

Regardless of which construction is now selected, the profiling asymmetry is to be selected so that the tooth or teeth affected by it is or are taken only somewhat from the load area, consequently experience reduced loading and are not taken completely away from the load, because otherwise the stress spikes would be merely shifted to the next tooth.

Preferably, the specific profiling provided according to the invention is provided on the planetary rolling elements, which is advantageous in terms of production, because here only one component of the planetary roller bearing must be produced with a specific profile, which is in contact with all of the other components, especially the rings, while in a corresponding profiling change on the part of the rings, both the inner and also the outer ring must be produced specifically accordingly.

If the tooth height was varied in the scope of the profile change, not only the height of the first tooth, viewed axially, can be reduced, but also the height of the last tooth, viewed axially, this could also be smaller than that of the following next-to-last tooth. In this case, viewed in the axial direction, a quasi-symmetrically changed tooth profile is given, that is, the tooth profile is varied equally on both sides. Here it is conceivable to construct the height of all teeth increasing from both sides toward the middle, so that, overall, a crowned cross sectional shape is produced. If such an axially viewed symmetric profiling change is performed, then regardless of whether only the first or last row of teeth or the rows of teeth are changed overall in height, there is the option of being able to install, in particular, the planetary rolling elements in any orientation.

As an alternative to the two-sided profile change, as described, there is the option of providing the profile change on the outermost row or row of teeth only on one side, that is, without affecting or changing the middle rows of teeth. Here, in particular, if the planetary rolling elements are changed accordingly, the offset inclination of a crowned planet that would be changed on both sides in profile, is minimized because the relieving of pressure is limited only on one or a few rows of teeth on one planet side.

If the profile change is realized by an axial variation of the distance, as already described, the distance of multiple successive teeth can always become larger, that is, for example, the distance between the first four teeth increases and then remains constant. In this change variant, the profile change is limited only to a few rows of teeth between which the distance is changed specifically, while the other rows of teeth all have the same constant distance. Alternatively, it is conceivable that the distance between adjacent teeth increases continuously up to the last tooth. This alternative provides a continuously increasing distance from the first up to the last tooth. Through corresponding selection of the profile change, the different requirements can consequently ultimately be taken into account during operation.

For this construction of the invention it also applies that the profile change is performed either on the planetary rolling elements, which is ultimately simpler in terms of production. As an alternative here there is also basically the option of changing the rings in profile accordingly.

The planetary rolling elements are preferably held on the end side in cage disks. The planetary rolling elements are supported so that they can rotate in the cage disks. Here, the cage disks have, e.g., corresponding bearing holes in which cylindrical end journals of the planetary rolling elements engage. The cage disks are connected to each other, for example, by means of connecting bars that run axially and are arranged adjacent to the planetary rolling elements.

BRIEF DESCRIPTION OF THE DRAWINGS

An embodiment of the invention is shown in the drawing and is described in more detail below. Shown are.

DETAILED DESCRIPTION OF THE PREFERRED EMBODIMENTS

Figure 1:
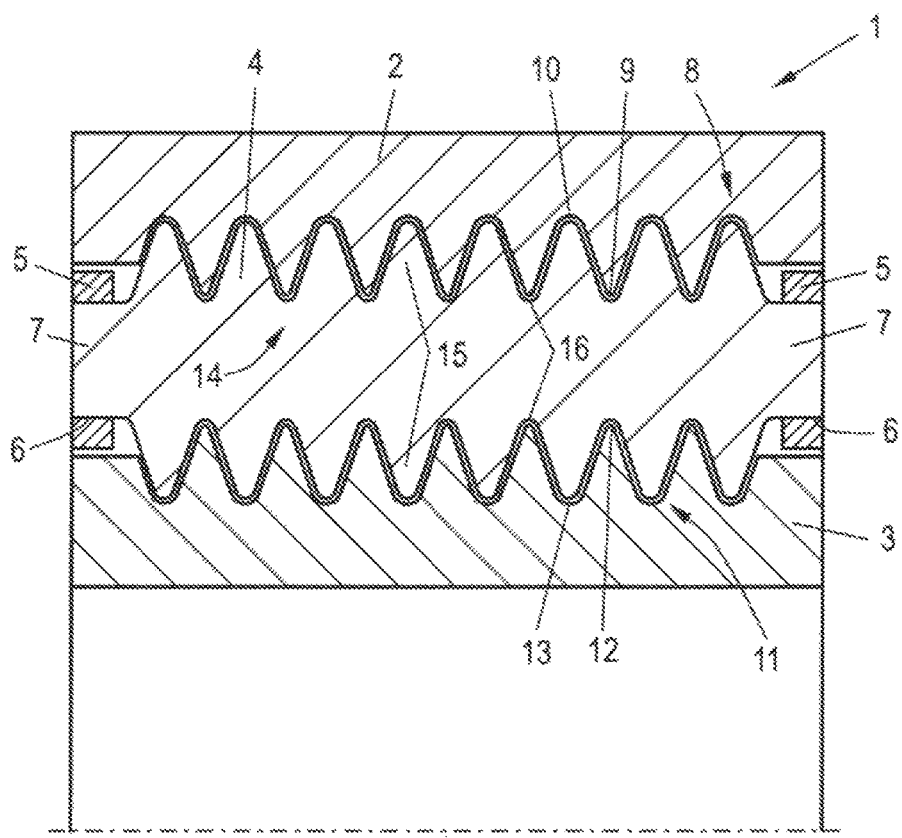
FIG. 1 a basic diagram of a planetary roller bearing in a sectioned part view.

FIG. 1 shows, in the form of a basic diagram, a planetary roller bearing 1 according to the invention, comprising an outer ring 2, an inner ring 3, and planetary rolling elements 4 that are arranged between these rings and of which only one is shown in this view. Typically, there are multiple, for example, six, eight, or more such planetary rolling elements 4 arranged distributed equidistantly around the circumference. The planetary rolling elements 4 are held so that they can rotate in two cage disks 5 that are provided on the ends and have corresponding bearing holes 6 in which non-profiled, cylindrical end journals 7 of the planetary rolling elements 4 engage. The cage disks 5 are connected to each other by means of connecting bars that are not shown in more detail and run axially and adjacent to the planetary rolling elements 4.

On the outer ring 2 there is a first tooth profile 8 comprising teeth 9 and circumferential grooves 10 formed between these teeth. Correspondingly, a tooth profile 11 is formed on the outside on the inner ring comprising teeth 12 and circumferential grooves 13 formed between these teeth. The tooth profiles 8 and 11 have an identical design, consequently also the corresponding groove construction.

Each planetary rolling element 4 is provided with a tooth profile 14 comprising teeth 15 and circumferential grooves 16 formed between these teeth. The tooth profile 14 engages in the tooth profiles 8 and 11 although a narrow gap is drawn for reasons of clarity. This means that the flanks of the teeth 15 roll on the flanks of the teeth 9 and 12, that is, a corresponding rolling contact is given.

For making the load distribution more uniform over the contact surfaces of the intermeshing teeth it should be assumed here that the tooth profile 14 of the planetary rolling elements 4 is profiled in a special way and is asymmetrical either with respect to the tooth height or the axial tooth distance, that is, the teeth do not all have the same height or the same distance to each other. In the following FIGS. 2-4, different embodiments for such a specific tooth profiling are given. The different embodiments make it possible to take the first tooth, viewed in the load direction, and optionally also subsequent teeth, somewhat from the load, that is, the load applied there is somewhat reduced and distributed more uniformly to the subsequent teeth.

Figure 2:
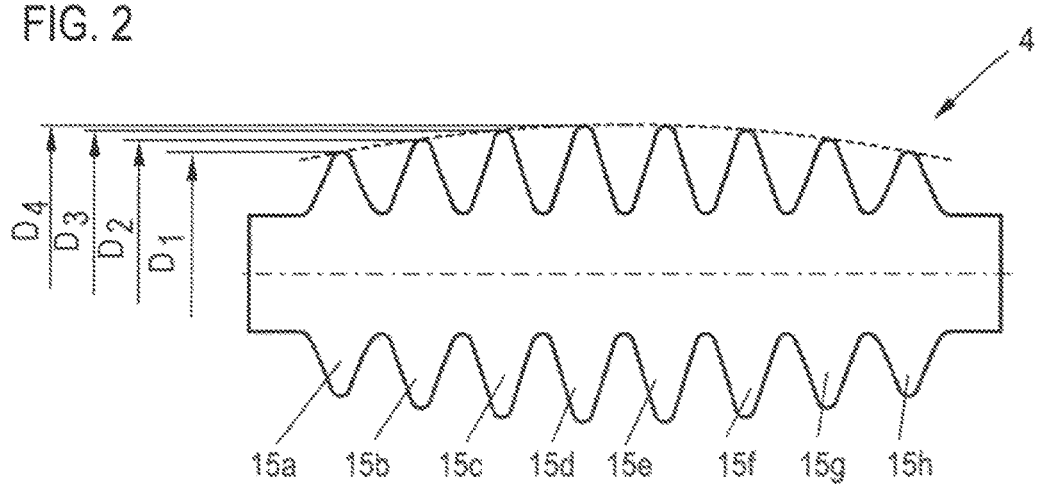
FIG. 2 a basic diagram of a planetary rolling element profiled according to the invention of a first embodiment, FIG. 3 a basic diagram of a planetary rolling element profiled according to the invention of a second embodiment, FIG. 4 a basic diagram of a planetary rolling element profiled according to the invention of a third embodiment, and FIG. 5 a basic diagram of an outer and inner ring with a profiling according to the invention.

In this context, FIG. 2 shows a first alternative construction of a planetary rolling element 4. In the shown embodiment, this has a total of eight teeth $15a, 15b, 15c, \ldots 15h$. As can be seen from FIG. 2, the respective teeth height or diameter of the individual teeth is not equal. In the illustrated example, the two end teeth 15a and 15h have the smallest diameter $D_1$. The following teeth 15b and 15g, respectively, have somewhat larger diameter $D_2$ accordingly. The following teeth 15c and 15f, in turn, have an even somewhat larger diameter D3, while the two middle teeth 15d and 15e have the largest diameter D4. Thus, overall a crowned outer shape is produced. Due to the reduced diameter and, in particular, its smallest diameter at the two outermost teeth 15a and 15h, these two teeth are loaded less, because the contact surface or the engagement in the tooth profile 8 and 11, respectively, is reduced. If, for example, the tooth 15a is the first tooth, viewed in the load direction, then it is loaded less than the following tooth 15b that is somewhat larger in diameter and consequently engages farther into the tooth profiles 8, 11, consequently is loaded somewhat stronger, which in turn is relevant for the somewhat larger dimension for the following teeth 15c, 15d. A load-dependent stress spike, consequently the greatest load, is no longer on the first tooth 15a, but is instead distributed more uniformly to all teeth. The loading on the outermost teeth is consequently reduced, resulting from the radial diameter variation of the teeth.

Figure 3:
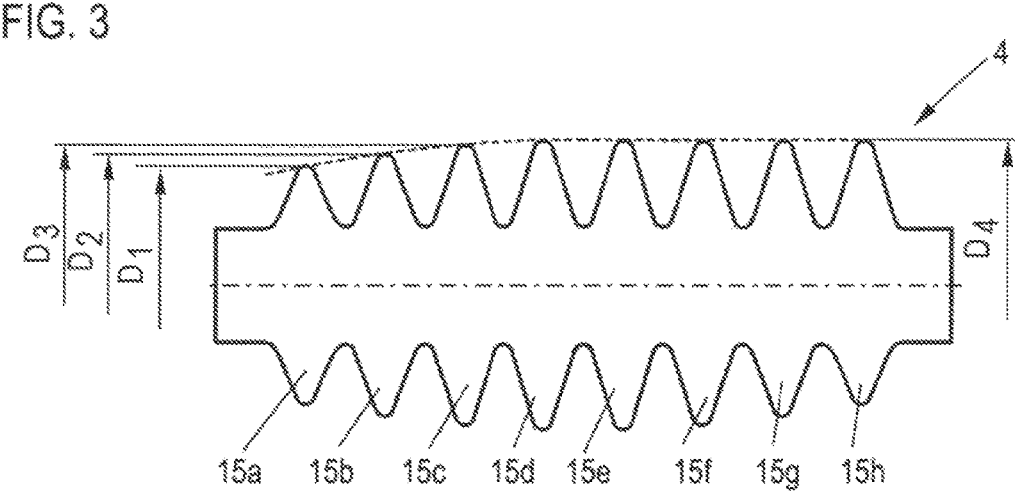

While FIG. 2 shows a crowned base shape of the planetary rolling element 4, FIG. 3 shows an embodiment in which the planetary rolling element 4 is likewise asymmetrical with respect to the tooth height, but is changed only on one side, so that consequently only a quasi "one-sided crown shape" is produced. It is assumed, in turn, that eight teeth 15a-15h are provided. Only the teeth 15a, 15b, and 15c have a reduced tooth diameter or tooth height, which increases from outside to inside, with the diameters D1 on tooth 15a, D2 on tooth 15b, and D3 on tooth 15c. The following teeth 15d-15h all have the same diameter D4. Obviously, the load is also made more uniform here, because, in particular, the tooth 15a, but also the teeth 15b and 15c are taken somewhat out from the load. However, here the offset inclination of the planets is minimized because the other teeth 15d-15h all have the same height.

Although multiple teeth have different heights in the shown embodiments, it is obviously also conceivable to somewhat reduce only the outermost tooth or the two outermost teeth in height. This can already provide an improvement in the load distribution.

Figure 4:
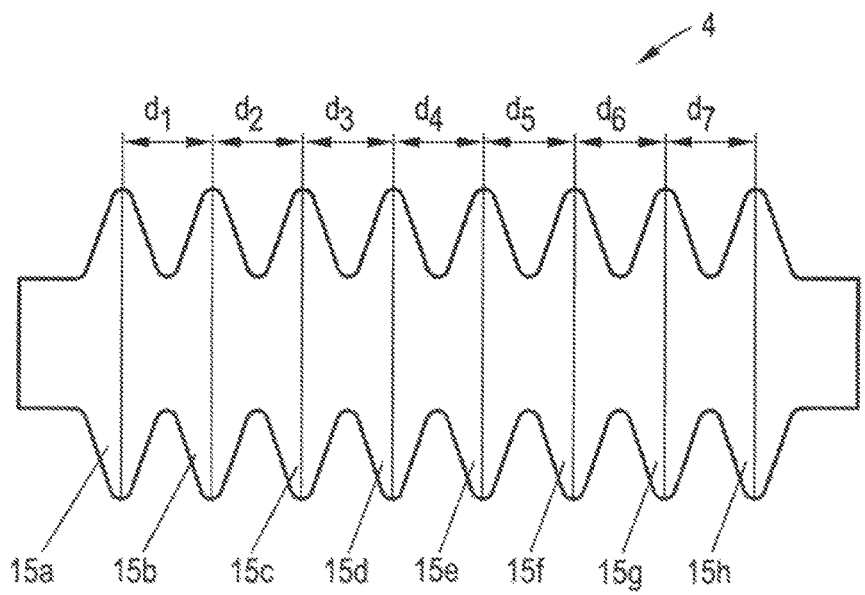

FIG. 4 shows an embodiment of a planetary rolling element 4, in turn, comprising eight teeth 15a-15h, which all have the same diameter D, but in which the distance from tooth to tooth is not equal, that is, a varying pitch of the rows of teeth is given. The distances of the teeth to each other are indicated in FIG. 4 with d1 (distance from tooth 15a to tooth 15b), d2 (distance from tooth 15b to tooth 15c), . . . d7 (distance from tooth 15g to tooth 15h).

It should be assumed that the load is introduced, with respect to FIG. 4, from the left, that is, the load is first applied on the tooth 15d. The distance can then continuously increase, e.g., from left to right, that is: d1<d2<d3<d4<d5<d6<d7. Due to this continuously increasing tooth distance, it is also achieved that the recorded load is distributed more uniformly over the tooth contacts, consequently, load is removed, in particular, from the first tooth 15a.

As an alternative to the progressive pitch of the rows of teeth with increasing distance over all of the tooth distances, it is naturally also conceivable for only the first, the first two, or the first three tooth distances to have a reduced design and then to keep the tooth distances constant. In other words, for example, the following distance relationships could be given: d1<d2=d3=d4=d5=d6=d7 or d1<d2<d3=d4=d5=d6=d7 or d1<d2<d3<d4=d5=d6=d7. Also here, different construction variants are conceivable, like also for height or diameter variation.

It is understood that the corresponding diameter or distance variations equal a few hundredths or tenths of millimeters, wherein the actual changes are obviously oriented to the structural size and the load relationships to be expected.

FIG. 5 finally shows a partial view of a planetary roller bearing 1 in which—differently than in the previously described embodiments—the tooth profiles 8 and 11 of the outer ring 2 and the inner ring 3 were changed. In the shown example it is assumed that the height of the teeth was varied. That is, the teeth 9a and 12a—with reference to their respective groove base—both have the same height, but are somewhat lower than the adjacent second teeth 9b and 12b, which are, in turn, somewhat lower than the teeth 9c and 12c. The respective tooth profile 8 or 11 can vary in height on both sides—comparable with the tooth profile of the planetary rolling element 4 according to FIG. 2—so that a crowned structure is produced. Alternatively, the tooth profile 8 or 11 could also be structured as is shown for the planetary rolling element 4 according to FIG. 3. The curved structure is indicated by the dashed line.

The tooth profile of the respective profiled rolling element 4 would not be changed in this case, that is, all teeth would have the same height and all distances between two teeth would be equal. This is because the respective teeth of the two rings 2 are taken somewhat out of the loading.

As an alternative to the shown variation of the tooth height on the outer ring 2 and on the inner ring 3, there is naturally the option of varying the respective tooth distance, comparable with the planetary rolling element 4 from FIG. 4, that is, the distance of the tooth 9a to the tooth 9b or the tooth 12a to the tooth 12b is somewhat smaller than the distance of the tooth 9b to the tooth 9c or the tooth 12b to the tooth 12c, etc. The profiling can be changed similarly, as described with respect to the planetary rolling element 4 according to FIG. 4.

LIST OF REFERENCE NUMBERS

1 Planetary roller bearing
2 Outer ring
3 Inner ring
4 Planetary rolling element
5 Cage disk
6 Bearing holes
7 End journal
8 Tooth profile
9 Tooth
10 Groove
11 Tooth profile
12 Tooth
13 Groove
14 Tooth profile
15 Tooth
16 Groove
D Diameter
d Distance

The invention claimed is:

1. A planetary roller bearing comprising:
an outer ring including a first set of teeth,
an inner ring including a second set of teeth, and
planetary rolling elements arranged between the outer ring and the inner ring, the planetary rolling elements each including a third set of teeth configured to engage with the first set of teeth and the second set of teeth,
wherein a height of at least three successive teeth gradually increases from an axial end of a selected set of the first, second, or third sets of teeth.

2. The planetary roller bearing according to claim 1, wherein the planetary rolling elements are held on an end side in cage disks.

3. The planetary roller bearing according to claim 1, wherein middle teeth of the selected set of the first, second, or third sets of teeth have identical heights.

4. A planetary roller bearing comprising:
an outer ring including a first set of teeth,
an inner ring including a second set of teeth, and
planetary rolling elements arranged between the inner ring and the outer ring, the planetary rolling elements each including a third set of teeth configured to engage with the first set of teeth and the second set of teeth,
wherein a distance between adjacent teeth of a selected set of the first, second, or third sets of teeth is non-uniform,
wherein the distance between adjacent teeth increases continuously between a first tooth and a last tooth of the selected set of the first, second, or third sets of teeth.

5. A planetary roller bearing comprising:
an outer ring including a first set of teeth,
an inner ring including a second set of teeth, and
planetary rolling elements arranged between the inner ring and the outer ring, the planetary rolling elements each including a third set of teeth configured to engage with the first set of teeth and the second set of teeth,
wherein a distance between adjacent teeth of a selected set of the first, second, or third sets of teeth is non-uniform,
wherein the distance between adjacent teeth is constant after multiple increases.

6. A planetary roller bearing comprising:
an outer ring including a first set of teeth,
an inner ring including a second set of teeth, and
planetary rolling elements arranged between the outer ring and the inner ring, the planetary rolling elements each including a third set of teeth configured to engage with the first set of teeth and the second set of teeth, wherein a height of at least three successive teeth from both axial ends of a selected set of the first, second, or third sets of teeth gradually increases.

7. The planetary roller bearing according to claim 6, wherein a height of each tooth after the at least three successive teeth is constant.

\* \* \* \* \*